(12) United States Patent
Laugeois

(10) Patent No.: US 9,197,310 B2
(45) Date of Patent: Nov. 24, 2015

(54) MULTI-ANTENNA RECEIVER WITH A TIME SYNCHRONIZATION COMMON TO THE DIFFERENT RECEIVER CHAINS

(71) Applicant: COMMISSARIAT A L'ENERGIE ATOMIQUE ET AUX ENE ALT, Paris (FR)

(72) Inventor: Marc Laugeois, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/584,119

(22) Filed: Dec. 29, 2014

(65) Prior Publication Data

US 2015/0195029 A1 Jul. 9, 2015

(30) Foreign Application Priority Data

Jan. 6, 2014 (FR) .................................... 14 50051

(51) Int. Cl.
*H04B 7/10* (2006.01)
*H04L 1/02* (2006.01)
(Continued)

(52) U.S. Cl.
CPC .............. *H04B 7/0814* (2013.01); *H04B 7/082* (2013.01); *H04B 7/0808* (2013.01);
(Continued)

(58) Field of Classification Search
CPC ...... H04B 7/0814; H04B 7/0808; H04B 7/08; H04B 7/0802; H04B 7/0811; H04B 7/0817; H04B 7/082; H04B 7/0842; H04B 7/0857; H04L 27/2656

USPC ............................................ 375/267, 347, 260
See application file for complete search history.

(56) References Cited

U.S. PATENT DOCUMENTS 5,768,698 A    6/1998  Kinoshita
2008/0279315 A1* 11/2008  Sato .............................. 375/345
(Continued)

FOREIGN PATENT DOCUMENTS

EP    0 454 585 A1   10/1991
EP    1 569 361 A2    8/2005
(Continued)

OTHER PUBLICATIONS

Yang Bing, et al., "Improved AGC method for B3G MIMO-OFDM system", The Journal of China Universities of Posts and Telecommunications, vol. 14, Issue 3, Sep. 2007, 4 pages.
(Continued)

*Primary Examiner* — Phuong Phu
(74) *Attorney, Agent, or Firm* — Oblon, McClelland, Maier & Neustadt, L.L.P.

(57) ABSTRACT

The invention relates to a receiver of a signal built as successive frames, comprising a plurality of antennas, a signal receiving chain associated with each antenna, and a power amplifier on each receiving chain to which is applied a gain set point provided by a gain control unit characterized in that it comprises an antenna selecting unit configured to select one antenna from the plurality of antennas, and a time synchronizing unit configured to determine the frame start and end times in the signal received by the selected antenna. The antenna selecting unit is further configured to assess the gain set point of each receiving chain and to eliminate from the selection each antenna associated to a receiving chain which gain set point in not in a steady state.

8 Claims, 2 Drawing Sheets

(51) Int. Cl.
*H04B 7/08* (2006.01)
*H04L 27/26* (2006.01)

(52) U.S. Cl.
CPC ......... *H04B 7/0817* (2013.01); *H04L 27/2656* (2013.01); *H04B 7/0837* (2013.01); *H04B 7/0848* (2013.01); *H04B 7/0857* (2013.01)

(56) References Cited

U.S. PATENT DOCUMENTS

2010/0316094 A1\* 12/2010 Tung .............................. 375/150
2013/0114768 A1   5/2013 Alapuranen

FOREIGN PATENT DOCUMENTS

| EP | 1 702 554 A1 | 9/2006 |
|---|---|---|
| JP | 4-11416 | 1/1992 |
| JP | 05-22201 | 1/1993 |
| WO | WO 2005/036777 A1 | 4/2005 |

OTHER PUBLICATIONS

French Preliminary Search Report issued Oct. 20, 2014 in French Application 14 50051, filed on Jan. 6, 2014 (with English Translation of categories Documents).

Extended European Search Report issued May 28, 2015 in Patent Application No. 14200438.1(with unedited computer generated English translation).

\* cited by examiner

MULTI-ANTENNA RECEIVER WITH A TIME SYNCHRONIZATION COMMON TO THE DIFFERENT RECEIVER CHAINS

TECHNICAL FIELD

The invention relates to the transmission of digital signals and their reception by a multi-antenna system. The invention relates more particularly to synchronizing a multi-antenna receiver of such a signal, and advantageously finds its application in baseband decoding of OFDM (Orthogonal Frequency Division Multiplex) signals.

STATE OF PRIOR ART

In MIMO (Multiple Input Multiple Output: several transmitting antennas and several receiving antennas) or SIMO (Single Input Multiple Output: one transmitting antenna, several receiving antennas) transmission systems, the receiver has several antennas and therefore several RF receiving chains.

FIG. 1 shows an exemplary conventional architecture of a 2-antenna receiver.

On a receiving chain, at the output of an analog-to-digital converter, data data0, data1 coming from an antenna enter a gain control unit AGC0, AGC1, the role of which is to adjust the gain gain0, gain1 of an RF amplifier so that the analog-to-digital converter arranged downstream of the amplifier works in its linear region.

Once this gain is adjusted, a time synchronization of the incoming data stream must be performed by means of a time synchronizing unit ST0, ST1. Time synchronizing consists in determining the frame start and end times in the received signal. Data on which a synchronizing algorithm operates must not vary in power. The gain control and time synchronizing units of a decoding chain are therefore closely linked.

Furthermore, there is, downstream on each receiving chain, a Fourier transform unit FFT0, FFT1, the sequencing of which is controlled by the time synchronizing unit ST0, ST1 which delivers to this purpose a starting signal Start0, Start1 to it when a frame start time is determined. The Fourier transform unit FFT0, FFT1 works on data Data0, Data1 coming from a frequency correcting unit CF0, CF1 to which data data0, data1 at the output of the analog-to-digital converter are provided.

Each receiving chain further comprises downstream of the Fourier transform unit FFT0, FFT1 various demodulating units, such as for example a separating unit A0, A1 for data and pilots, a frequency correcting unit B0, B1, a channel estimating unit C0, C1 and an equalization unit D0, D1. A per-chain sequencing unit S0, S1 is furthermore required to ensure sequencing of the decoding operations.

In addition, any multi-antenna receiver needs to recombine the data coming from each receiving chain in order to provide the decoded stream which will enable binary information to be obtained. This is done by means of an MRC recombining unit (for example operating, for an SIMO system, a Maximum Ratio Combining-type algorithm). It should be noted that the conventional recombining patterns in a SIMO system imply that data exhibits consistent power ratios. This recombining further requires to provide, upstream of the MRC recombining unit, a resynchronizing unit RS of each data stream. But this resynchronizing unit RS can prove to be quite complex and expensive regarding the buffer storage.

Thus, according to such a conventional architecture, each antenna is separately processed up to the equalization, and then it is recombined according to the diversity pattern. This results in a certain material complexity particularly due to the multiple time synchronizing units ST0, ST1, the multiple sequencing units S0, S1, the making of the resynchronizing unit RS and the making of the sequencing of the receiving chain.

DISCLOSURE OF THE INVENTION

The aim of the invention is a multi-antenna receiver having a simpler architecture than the conventional architecture set forth above, and provides to this purpose a receiver for a signal built as successive frames, comprising a plurality of antennas, a signal receiving chain associated with each antenna, and a power amplifier on each receiving chain to which is applied a gain set point provided by a gain control unit. The receiver further comprises an antenna selecting unit configured to select one antenna from the plurality of antennas, and a time synchronizing unit configured to determine the frame start and end times in the signal received by the selected antenna. The antenna selecting unit is further configured to assess the gain set point of each receiving chain and to eliminate from the selection the antennas associated to a receiving chain which gain set point in not in a steady state.

Certain preferred but not limiting aspects of this receiver are as follows:
- the antenna selecting unit is configured to select the antenna associated with the receiving chain, the gain set point of which is the lowest;
- the antenna selecting unit is configured to select one antenna from the antennas associated with a receiving chain with a power level higher than a threshold level;
- the time synchronizing unit is configured, once a frame start time is determined, to freeze the gain set points until the frame end time;
- the gain control unit is configured to compute a gain set point for a receiving chain independently of the other receiving chains;
- each receiving chain further comprises a Fourier transform unit with a sequencing controlled by the time synchronizing unit;
- it further comprises a recombining unit for the signals received by each antenna, said recombining unit being configured to apply to the signal received by each antenna a weighting according to the gain difference with the receiving chain having the lowest gain.

The invention also relates to a method for receiving a signal built as successive frames, implemented in a receiver comprising a plurality of antennas, a signal receiving chain associated with each antenna, and a power amplifier on each receiving chain to which is applied a gain set point provided by a gain control unit. The method comprises an operation of selecting an antenna from the plurality of antennas, and an operation of time synchronizing to determine the frame start and end times in the signal received by the selected antenna. The operation of selecting comprises assessing the gain set point of each receiving chain and eliminating from the selection the antennas associated to a receiving chain which gain set point in not in a steady state.

The invention also extends to a computer program product comprising code instructions for executing operations of the method according to the invention when said program is executed on a computer.

BRIEF DESCRIPTION OF DRAWINGS

Further aspects, aims, advantages and characteristics of the invention will better appear upon reading the following detailed description of preferred embodiments thereof, given by way of non-limiting examples, and in reference to the accompanying drawings in which.

DETAILED DISCLOSURE OF PARTICULAR EMBODIMENTS

The invention relates to a receiver for a signal built as successive frames, comprising a plurality of antennas and a signal receiving chain associated with each antenna. It can be a receiver of a SIMO or MIMO transmission system, and the signal can be an OFDM signal, for example with a cyclical prefix. The receiver further comprises a power amplifier on each receiving chain to which is applied a gain set point provided by a gain control unit.

Figure 1:
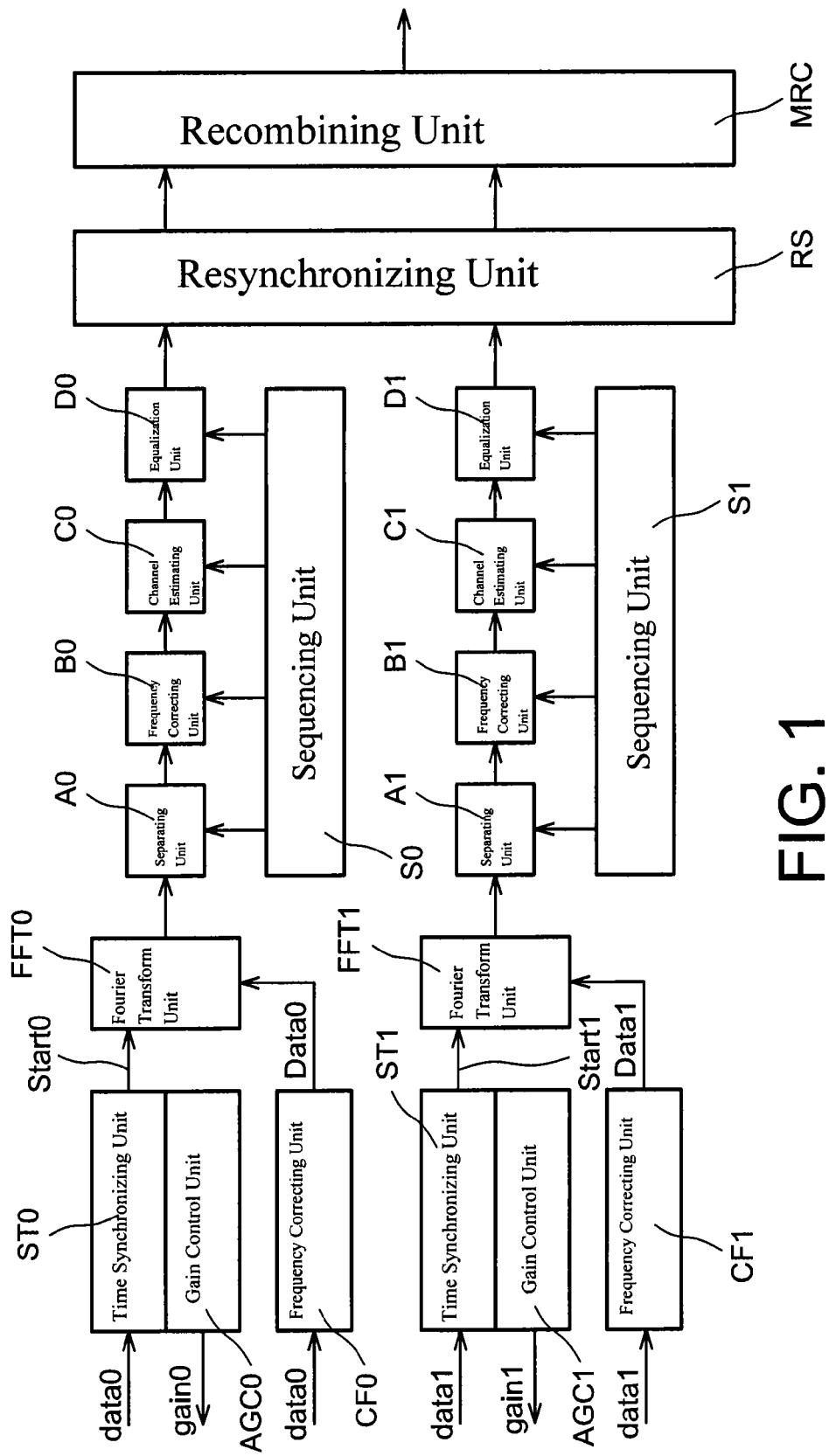
FIG. 1, already previously discussed, is a diagram showing a conventional multi-antenna receiver.
Figure 2:
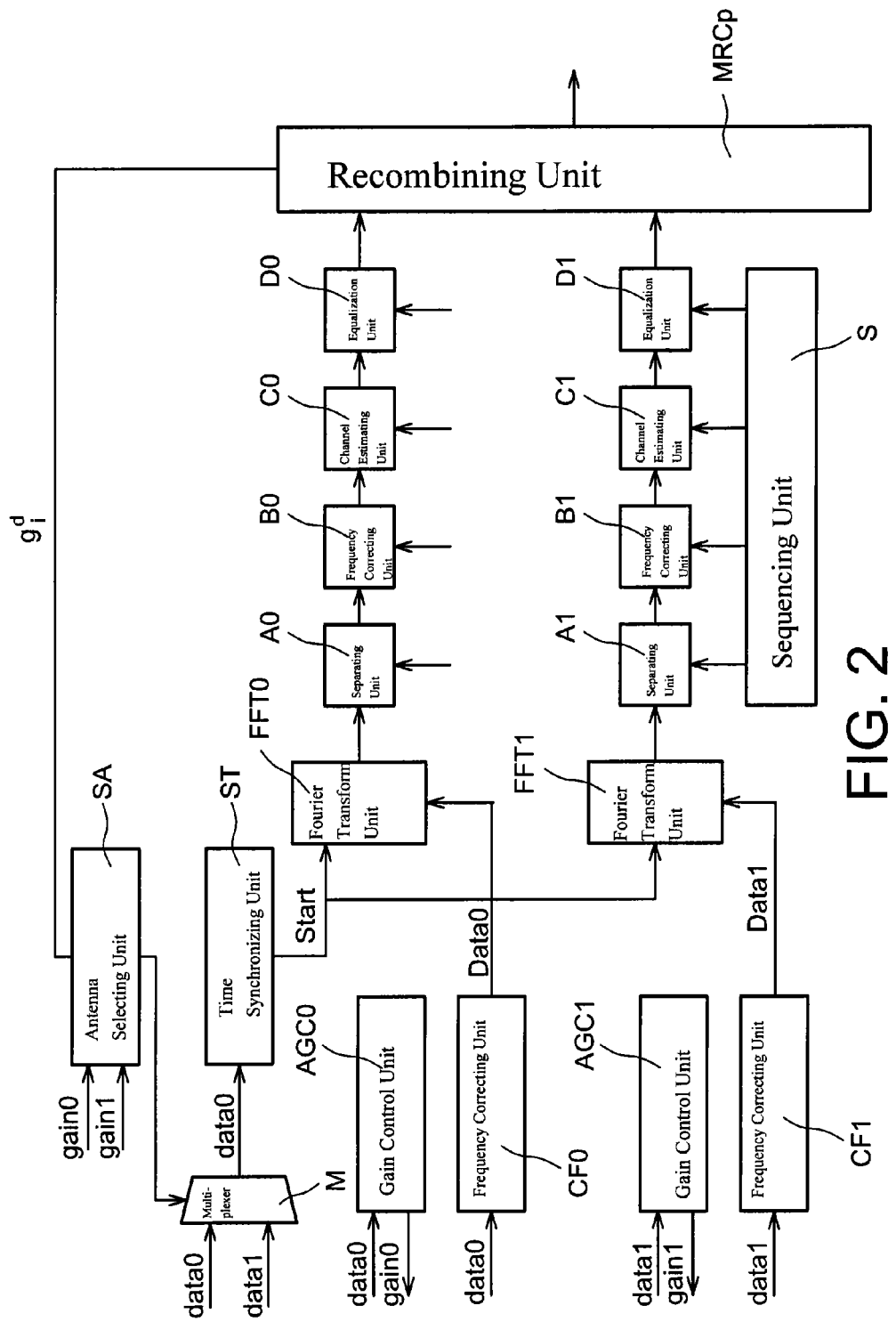
FIG. 2 is a diagram showing a multi-antenna receiver according to a possible embodiment of the invention.

The diagram of FIG. 2 shows an exemplary embodiment of a receiver according to the invention, in this case a 2-antenna receiver, this example being in no way limiting. In this diagram, the elements common to the receiver of FIG. 1 bear the same references.

On each receiving chains, each being associated with one of the antennas, there is a gain control unit AGC0, AGC1 configured to compute a gain set point gain0, gain1 for the corresponding receiving chain, and to provide said fain set point to the corresponding power amplifier.

In the represented example, a gain control unit AGC0, AGC1 is configured to compute a gain set point for its receiving chain, independent of the other receiving chains. The invention is however not limited to a gain control performed separately on each antenna, but also extends to other gain control methods adapted to a multi-antenna context, for example of the type of those described in Yang Bing et al.'s article entitled "Improved AGC method for B3G MIMO-OFDM system", The journal of China Universities of Posts and Telecommunications, vol. 14, issue 3, September 2007.

Furthermore, on each receiving chain, there is a Fourier transform unit FFT0, FFT1 which works on data Data0, Data1 coming from a frequency correcting unit CF0, CF1 to which the data data0, data1 at the output of the analog-to-digital converter are provided. And there are also the various demodulating units A0-D0, A1-D1 previously set forth.

The receiver according to the invention is characterized in that it comprises an antenna selecting unit SA configured to select one antenna from the plurality of antennas, and a time synchronizing unit ST configured to determine the frames start and end times in the signal received by the selected antenna. In the example of FIG. 2, the antenna providing the data data0 is thus selected, the antenna selecting unit SA controlling a multiplexer M receiving as input the data data0, data1 of each receiving chain.

Within the scope of the invention, sequencing the Fourier transform unit FFT0, FFT1 of each receiving chain can be controlled by the time synchronizing unit ST. As indeed represented in FIG. 2, the time synchronizing unit ST informs the Fourier transform unit FFT0, FFT1 of each receiving chain of the frame start times in the signal received by the antenna selected by the antenna selecting unit SA, by delivering a common starting signal Start.

In this way, the receiver according to the invention can only have a single synchronizing unit ST, common to the set of receiving chains and carrying out a synchronizing on the single antenna selected by the antenna selecting unit SA. This results in a significant material reduction compared to a conventional architecture comprising as many synchronizing units as antennas and receiving chains.

In this way also, sequencing the decoding operations is also common to the set of receiving chains. Indeed, indicating the frame start time enables the start of the Fourier transform to be synchronized as well as the state machine sequencing the decoding operations performed by the demodulating units A0-D0, A1-D1. A single sequencing unit S, common to the set of chains, can prove to be necessary. This results in a significant material reduction compared to a conventional architecture comprising as many sequency units as antennas and receiving chains.

Besides, this synchronizing common to all the chains makes resynchronizing the data streams before recombining useless. Recombining is thus performed in a recombining unit MRCp directly on the data streams at the output of the demodulating units A0-D0, A1-D1, without an intermediate resynchronizing unit RS.

On the other hand, the synchronizing being common to each channel, a tolerant modulation to its time position is necessary. The cyclical prefix OFDM modulation, or CP-OFDM, fulfils this criterion when the synchronizing algorithm detects the frame start sample in the cyclical prefix. The invention also applies to every modulation in which the waveform is tolerant to a shift of the temporal synchronization with respect to the synchronization ideal instant.

Coming back to the antenna selecting unit SA, and as represented in FIG. 2, this unit can be configured to assess the gain set point gain0, gain1 of each receiving chain, and to perform selecting an antenna according to the result of this assessment. For example, the antenna selecting unit SA is configured to select the antenna associated with the receiving chain, the gain set point of which is the lowest. In such way, the time synchronizing is performed from data coming from the antenna receiving the strongest power (the signal-to-noise ratio is therefore optimum).

In such a case, the time synchronizing unit is preferably configured, once a frame start time is determined, to freeze the gain set points gain0, gain1 and deactivate the antenna selecting module SA until the frame end time.

The antenna selecting unit SA is furthermore configured to perform selection of one antenna only from the antennas associated with a receiving chain with a gain set point in a steady state and, if need be, with a power level higher than a threshold level. In this case, the antennas associated to a receiving chain having a gain set point in a non-steady state are eliminated from the selection, which allows for a quickest selection by the antenna selecting unit et for eliminating the receiving chains that are likely to degrade the final decoding.

By steady state of the gain set point, it is meant a stabilized gain computation, allowing for the associated amplifier to which the computed gain set point is provided to work in its working linear region. Information regarding the steady state of the gain set point of a receiving chain can be provided to the antenna selecting unit SA by the corresponding gain control module AGC0, AGC1.

By only referring to the antennas associated with a receiving chain with a gain set point in a steady state and with a power level higher than a threshold level, the antennas which are not properly power controlled are not taken into account. Disabling the receiving chain associated with a not properly power slaved antenna can furthermore be performed, which enables energy savings.

In a possible embodiment of the invention, the recombining unit MRCp of the signals received by each antenna can be configured to apply to the signal received by each antenna a weighting depending of the gain difference with the receiving chain having the lowest gain. As represented in FIG. 2, this weighting $g_i^d$ can be computed by the antenna selecting unit SA and provided by the latter to the recombining unit MRCp.

Such an exemplary embodiment is given thereafter in reference to a SIMO system and to a Maximum Ratio Combining-type recombining algorithm. This algorithm conventionally operates the following formula for an N-receiving antenna system:

$$y(k) = \sum_{i=0}^{N-1} \frac{\hat{h}_i^*(k) \cdot x_i(k)}{\sum_{i=0}^{N-1} \|\hat{h}_i(k)\|^2} = \frac{\sum_{i=0}^{N-1} \hat{h}_i^*(k) \cdot x_i(k)}{\sum_{i=0}^{N-1} \|\hat{h}_i(k)\|^2}$$

where k is the number of the subcarrier, i is the number of the antenna, $\hat{h}_i(k)$ is the coefficient of the channel estimation for the antenna i, $x_i(k)$ is the value of the subcarrier.

Within the scope of this embodiment of the invention, the preceding formula is modified to associate to each antenna a weighting depending on the power difference with respect to the antenna having the strongest power in the following way:

$$y(k) = \frac{\sum_{i=0}^{N-1} g_i^d \cdot \hat{h}_i^*(k) \cdot x_i(k)}{\sum_{i=0}^{3} g_i^d \cdot \|\hat{h}_i(k)\|^2}$$

where $g_i^d$ corresponds to the ratio between the lowest gain set point of the set of antennas (therefore corresponding to the gain set point of the antenna having the strongest power) and the gain set point of the antenna i.

We have seen previously that the conventional recombining patterns imply that the data have consistent power ratios. The modified recombination according to this embodiment of the invention allows this consistency criterion to be fulfilled and therefore the decoding performances to be improved.

Furthermore, the conventional recombining patterns imply that the gain of each antenna is included in $\hat{h}_i(k)$ and $x_i(k)$. The Fourier transform unit, as well as the demodulation units, therefore do not work on optimum signal dynamics and require a significant quantization to absorb the amplitude difference of each chain. Within the scope of this embodiment of the invention, taking into account the gain set points applies at the very end of a chain, at the time of the recombination. The Fourier transform input signal can then be normalized, which enables the dynamics of the abovementioned units to be supervised optimally, and above all which enables them to work on a reduced quantization.

The invention is not restricted to the multi-antenna receiver such as previously described, but also extends to the method for receiving a signal implemented in such a receiver, and particularly to a method comprising an operation of selecting one antenna from the plurality of antennas, and an operation of time synchronizing to determine the frame start and end times in the signal received by the selected antenna. And the invention also extends to a computer program product comprising code instructions for executing operations of the receiving method implemented in such a multi-antenna receiver when said program is executed on a computer.

The invention claimed is:

1. A receiver of a signal built as successive frames, comprising a plurality of antennas, a signal receiving chain associated with each antenna, a power amplifier on each receiving chain to which is applied a gain set point provided by a gain control unit, an antenna selecting unit configured to select one antenna from the plurality of antennas, and a time synchronizing unit configured to determine the frame start and end times in the signal received by the selected antenna, wherein the antenna selecting unit is further configured to assess the gain set point of each receiving chain and to eliminate from the selection each antenna associated to a receiving chain which gain set point is not in a steady state,
wherein each receiving chain further comprises a Fourier transform unit with a sequencing controlled by the time synchronizing unit.

2. The receiver according to claim 1, wherein the antenna selecting unit is configured to select, from the non-eliminated antennas, the antenna associated with the receiving chain, the gain set point of which is the lowest.

3. The receiver according to claim 1, wherein the antenna selecting unit is configured to select one antenna from the antennas associated with a receiving chain with a power level higher than a threshold level.

4. The receiver according to claim 1, wherein the time synchronizing unit is configured, once a frame start time is determined, to freeze the gain set points until the frame end time.

5. The receiver according to claim 1, wherein the gain control unit is configured to compute the gain set point for one receiving chain independently of the other receiving chains.

6. The receiver according to claim 1, further comprising a recombining unit for the signals received by each antenna, said recombining unit being configured to apply to the signal received by each antenna a weighting according to the gain difference with the receiving chain having the lowest gain.

7. A method for receiving a signal built as successive frames, implemented in a receiver comprising a plurality of antennas, a signal receiving chain associated with each antenna, and a power amplifier on each receiving chain to which is applied a gain set point provided by a gain control unit, wherein the method comprises an operation of selecting an antenna from the plurality of antennas, and an operation of time synchronizing to determine the frame start and end times in the signal received by the selected antenna, wherein the operation of selecting an antenna comprises assessing the gain set point of each receiving chain and eliminating from the selection each antenna associated to a receiving chain which gain set point is not in a steady state,
wherein said time synchronizing is performed by a time synchronizing unit and each receiving chain further comprises a Fourier transform unit with a sequencing controlled by the time synchronizing unit.

8. A computer program product comprising code instructions for executing operations when said computer program product is executed on a computer for controlling a receiver comprising a plurality of antennas, a signal receiving chain associated with each antenna, and a power amplifier on each receiving chain to which is applied a gain set point provided by a gain control unit, wherein said operations include:
an operation of selecting an antenna from the plurality of antennas, and
an operation of time synchronizing to determine the frame start and end times in the signal received by the selected antenna, wherein said operation of time synchronizing is performed by a time synchronizing unit and each receiving chain further comprises a Fourier transform unit with a sequencing controlled by the time synchronizing unit, and
wherein the operation of selecting an antenna comprises assessing the gain set point of each receiving chain and eliminating from the selection each antenna associated to a receiving chain which gain set point is not in a steady state.

* * * * *